UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

AZO DYE FROM AMIDOPHENOLSULFO-ACID.

SPECIFICATION forming part of Letters Patent No. 516,381, dated March 13, 1894.

Application filed September 19, 1893. Serial No. 485,885. (Specimens.) Patented in Germany July 13, 1892, No. 71,182; in England July 10, 1893, No. 13,402, and in Italy November 22, 1893, XXVIII, 34,895, LXIX, 51.

*To all whom it may concern:*

Be it known that I, CHRISTIAN RUDOLPH, chemist, residing at Offenbach-on-the-Main, Germany, assignor to THE FIRM OF K. OEHLER, of same place, have invented new and useful improvements in the production of a new azo dye-stuff of amidophenol-sulfonic acid dyeing directly unmordanted cotton, (for which patents have been granted as follows, viz: in Germany, No. 71,182, dated July 13, 1892; in Italy, Vol. XXVIII, No. 34,895, and Vol. LXIX, No. 51, dated November 22, 1893, and in England, No. 13,402, dated July 10, 1893,) of which the following is a specification.

10.6 parts by weight of tolidine are transformed in the usual way into tetrazoditolylchlorid by means of ninety-one parts of hydrochloric acid of ten per cent. and 6.9 parts of nitrite of soda. The tetrazoditolylchlorid is then poured into an aqueous solution of eight parts of soda and 10.6 parts of the sodium salt of the amidophenolsulfonic acid (the latter being obtained by melting the sulfurized metanilic acid with alkalies.) When the formation of the intermediate compound is finished, 5.5 parts of resorcin dissolved in forty parts of soda lye of ten per cent. are added, thus forming an intermediate dye stuff which is further treated with 11.7 parts of diazonaphthionic acid in an aqueous emulsion. After standing twenty-four hours, the whole mass is heated and the dye stuff precipitated by common salt.

The structural formula of the compound is as follows:

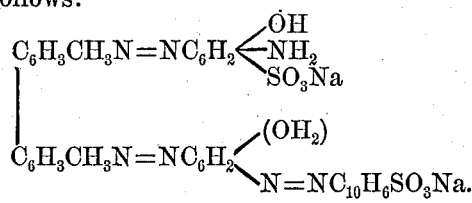

This coloring matter dyes unmordanted cotton in a corinth shade; it forms a greenish black powder with a slight metallic luster; it is soluble in water with a red brown and in sulfuric acid with a violet color. Diluted soda lye changes the color of the aqueous solution into magenta red; hydrochloric acid added to the solution produces a dark brown precipitate.

What I claim, and desire to secure by Letters Patent, is—

1. The method of producing an azo dye stuff from amidophenolsulfonic acid consisting in first obtaining an intermediate compound by adding tetrazoditolylchlorid to an aqueous solution of a sodium salt of said acid and soda, next adding to said intermediate compound a solution of resorcin in soda lye to form an intermediate dye stuff, afterward treating the said intermediate dye stuff with diazonaphthionic acid in an aqueous emulsion and finally heating the whole mass and precipitating the dye stuff with common salt, substantially as herein set forth.

2. As a new article of manufacture the dye herein described derived from tetrazoditolyl chlorid and amidophenol sulfonic acid being a greenish black powder with a slight metallic luster and dyeing unmordanted cotton in a corinth shade; its solution in water being red brown, and that in sulfuric acid violet; diluted soda lye changing the color of the aqueous solution into magenta red and hydrochloric acid producing a brown precipitate.

In testimony whereof I have signed my name to this specification in the presence of two subscribing witnesses.

CHRISTIAN RUDOLPH.

Witnesses:
JEAN GRUND,
PAUL WALCH.